Aug. 21, 1962     R. A. CLAPP     3,049,969
PHOTOGRAPHIC EXPOSURE READER
Filed April 6, 1959     2 Sheets-Sheet 1
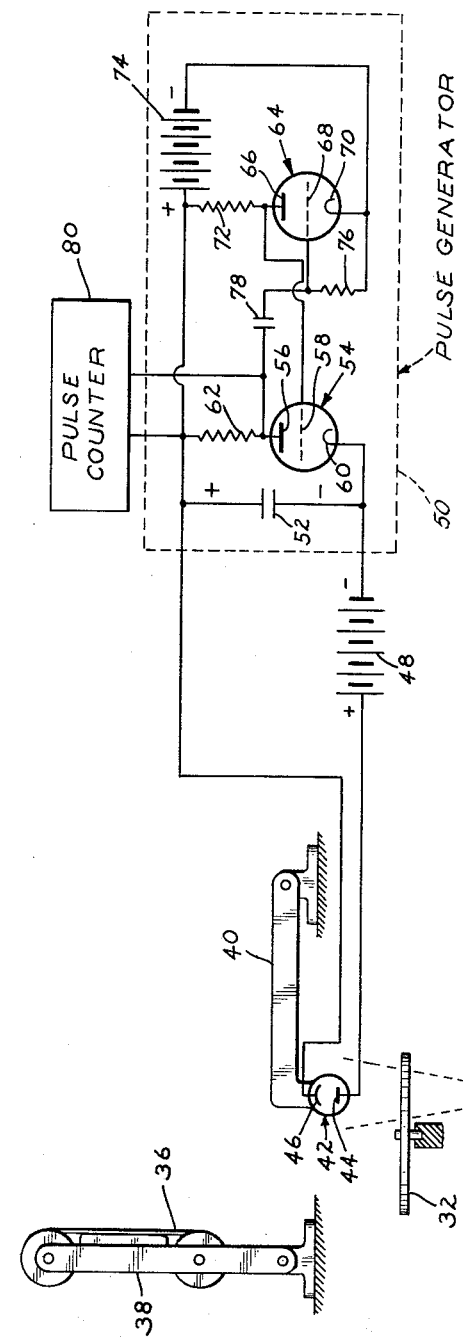
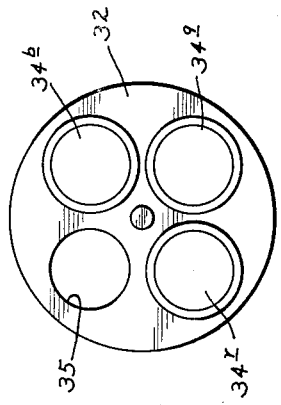
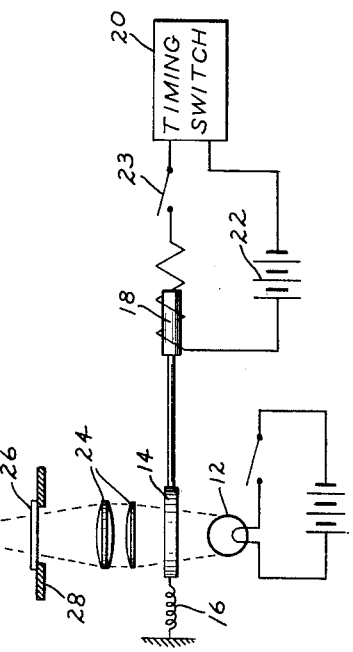
INVENTOR.
Roy A. Clapp
BY
ATTORNEY INVENTOR.
Roy A. Clapp
BY
*Jack W. Wicks*
ATTORNEY 3,049,969
PHOTOGRAPHIC EXPOSURE READER
Roy A. Clapp, Minneapolis, Minn., assignor to
Pako Corporation, Minneapolis, Minn.
Filed Apr. 6, 1959, Ser. No. 804,268
4 Claims. (Cl. 88—24)

This invention relates generally to the field of photography, and pertains more particularly to a system for determining the quanta of light striking a light sensitive material. Inasmuch as controlled exposure is a fundamental requirement in various phases of photography, the instant invention has broad and varied applications for both commercial and research purposes. However, the invention possesses especial utility when used in conjunction with a photographic printer, and therefore the invention will be described in association with such apparatus.

A general object of the instant invention is to provide a system for determining accurately the quanta of light, i.e. the total number of photons, that will impinge upon photosensitive material during a photographic exposure of such material to light. More specifically, an aim of the invention is to provide an exposure reading or exposure control that is a function of both the intensity of the light striking the material and the interval of time the material is subjected to light. In other words, while it is known to use photocells to detect or measure light intensity, it is the purpose of the present invention to integrate light intensity and exposure time, especially where the light intensity may fluctuate during the exposure period. The need for a truly accurate exposure reading instrument is particularly acute in the color photography art where color balance is so important.

Another object of the invention is to provide means by which photographic exposure apparatus, such as a printer, may be adjusted without making actual test runs, thereby effecting an appreciable saving of both time and materials.

Another object is to provide equipment for making routine checks quickly and easily at various times during the day so that operational deviations may be detected prior to their becoming serious enough to affect noticeably the quality of the work in progress.

Another object of the invention is to provide a convenient means by which a photographic printer may be properly and conveniently adjusted for making various enlargements.

A further feature of the invention resides in the facility with which the operator can rebalance his machine after a component, such as a photocell, light bulb, vacuum tube, filter, power pack or the like, has been changed.

Still further, an object of the invention is to minimize costly "down time" of the equipment.

Yet another object is to provide a photographic exposure reader that will serve as a trouble shooting device. Not only does my reader provide clues as to where to look for specific troubles of a persisting or continuous nature, but it has a decided advantage in the pin pointing of erratic malfunctioning which, in the case of a printer, might ruin a print only every now and then.

Also, the invention has for a feature the provision of an accurate instrument for determining photographic exposure for research work, such as where it is desired to study the effect of reciprocity failure in photographic materials.

A still further object of the invention is to provide a reader of the foregoing character that lends itself readily to photographic exposure control, acting to terminate the exposure interval after the proper amount or quanta of light has fallen on the emulsion surface.

Briefly speaking, the invention contemplates the ultilization of a photosensitive cell capable of providing an electrical signal in accordance with the intensity of the light impinging thereon. This output signal is fed to a storage capacitor which in turn controls the repetition rate of a variable frequency pulse generator. By counting the number of pulses produced by the generator, an accurate indication is derived as to the number of photons or light quanta striking the light sensitive cell or tube. Stated somewhat differently the resulting count is representative of the product of the light intensity and the time to which the photosensitive material is subjected to the light.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a schematic view of a photographic exposure reader embodying my invention;

FIGURE 2 is a plan view of a three-filter turret that would be utilized in the reading of colored photographic exposures;

Figure 4:
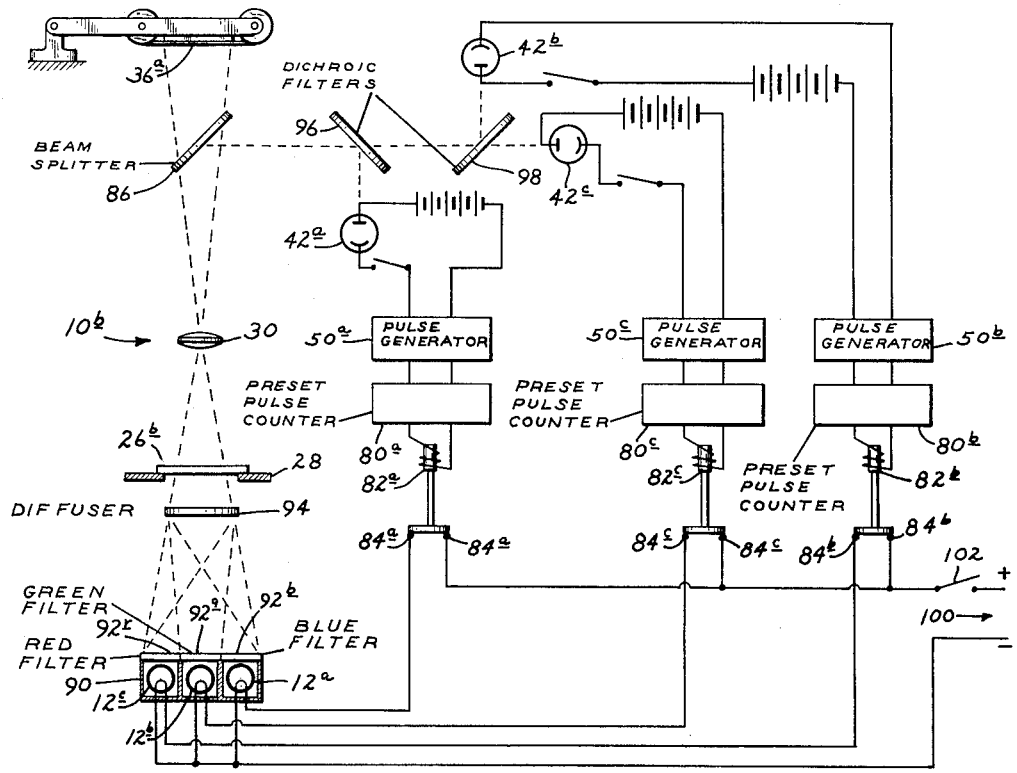
FIGURE 4 is a view corresponding to FIGURE 3 but illustrating a control system for use in making colored prints.

Referring first in detail to FIGURE 1, the exposure apparatus depicted for the purpose of illustrating the invention is in the form of a printer and has been denoted generally by the reference numeral 10. The printer conventionally comprises a light source provided by exposure lamp 12. A shutter 14 normally blocks the beam of light provided by the lamp 12, the shutter having connected thereto a coil spring 16 acting so as to bias the shutter into a light intercepting position and a solenoid 18 for actuating the shutter into an open or non-obstructing position. Energization of the solenoid 18 may be from an interval timer 20, a number of which timers are currently available, the timer 20 serving to supply electric power from a suitable source 22 via a switch 23 to the solenoid 18 only during the period that an exposure is taking place.

As is customary, the printer 10 includes a condenser lens 24 disposed in the light path so as to direct light onto a neutral density transparency 26 supported on an apertured mounting plate 28. The light transmitted through the transparency 26 passes through an objective lens 30 and from there is projected onto a three-filter turret 32 in the case of colored processing. The filter turret 32 is shown to better advantage in FIGURE 2, having a blue filter section 34b, a green filter section 34g, and a red filter section 34r, each of which can be moved into the light path. Also, the turret 32 has an opening 35 containing no filter for black and white processing.

Although it is generally known, it might be explained that the various filter sections 34 would have their respective densities adjusted in accordance with the sensitivity of the particular photosensitive material being employed. This adjustment is readily accomplished by adding neutral density filters which pass all colors equally but which do absorb light energy to the desired degree.

Next, the light strikes light sensitive material denoted by the numeral 36, which may be a roll of emulsion paper, since it has been decided to exemplify the invention in conjunction with a printer.

For the sake of simplicity, the supply of strip material 36 is carried on a hinged fixture 38 so that it can be readily swung upwardly out of the way, as shown in FIGURE 1. It will be understood, though, that the manner in which the light sensitive material 36 is mounted is unimportant to an appreciation of the invention as various other ways will be found even more practical than the pictured arrangement.

By means of a second hinged fixture 40, which in its pictured position is horizontal as it would actually be used for reading purposes, a photosensitive probe or head 42 may be lowered into substantially the plane that the material 36 would normally assume. In this way, during a printing operation the light sensitive material 36 would, of course, be subjected to light energy arriving from the lamp 12, and during a test period the probe 42 would receive the light energy.

The photosensitive probe or head 42 may be a photovoltaic or photoconductive cell, or it may be a photoemissive tube. In this instance, it will be assumed for the sake of discussion that the latter type has been selected. In actual practice a phototube of the multiplier type, such as a 931—A tube, would have certain advantages. As will presently become manifest, the phototube utilized as the probe or head 42 should have a linear relation between photocurrent and light flux within the intended operating range. The phototube 42 has an anode 44 and a cathode 46, the anode being connected to the positive side of a battery 48. In shunt relation with the capacitor 52 is a normally non-conducting vacuum triode 54, such as one-half of a 12AX7 tube. The triode tube section is comprised of a plate 56, control grid 58 and cathode 60. A plate resistor 62 connects the plate 56 to one plate of the capacitor 52, whereas the cathode 60 is connected directly to the other plate of this capacitor. Since the tube 54 is normally non-conducting it will present an open circuit across the capacitor 52 as long as the charge on the capacitor is below a certain voltage level. Although the role played by the capacitor 52 will be better understood as the description progresses, nonetheless it can be explained at this time that as the charge builds up due to the signal produced by the phototube 42, the capacitor will trigger the pulse generator 50 to produce an output pulse via the resistor 62. Repeated charging and discharging will produce a series of output pulses dependent upon the signal forwarded from the tube 42.

Coupled to the triode 54 is a second triode 64, for instance the other half of the twin triode 12AX7 if such a tube is utilized, which tube 64 includes a plate 66, control grid 68 and cathode 70. In circuit with the tube 64 is a plate resistor 72 and a plate supply or "B" battery 74. The battery 74, however, does not furnish the plate voltage to the tube 54, because only the positive side of the battery 74 is connected to the plate 56 of tube 54 through resistor 62 as shown; the negative side of the battery has no connection to the tube 54. Instead, the plate voltage for tube 54 is supplied by the capacitor 52, the magnitude of such voltage depending upon the state of charge of this capacitor. A grid resistor 76 connects the grid 68 to the cathode 70, and a capacitor 78 couples this grid to the plate 56 of the tube 54. The plate 66 of tube 64 is connected directly to the grid 58 of tube 54.

As will be explained more fully when describing a typical operation, each voltage pulse across the plate resistor 62 will be in accordance with the light quanta impinging upon the photosensitive head 42 that has effected a predetermined charging of the capacitor 52; it follows, then, that a count of such pulses will be indicative of the total light energy or quanta that has fallen on the tube 42 in any particular period. Accordingly, a pulse counter 80 is connected across the plate resistor 62. Various high speed electronic counters are on the market, and a number of these counters are referred to in the book "Digital Computer Components and Circuits" written by R. K. Richards and published by D. Van Nostrand Company, Inc. in November 1957. For both reading and controlling purposes a preset counter, such as Model No. 5423 manufactured by Beckman Instruments, Inc., will function very well. This particular model registers up to 1,000 and can be set so as to emit an output signal upon reaching a desired count.

Having in mind the construction and arrangement of the components depicted in FIGURE 1, it is believed that a complete understanding of this particular embodiment may now be had from the following typical operational sequence. With the fixture 38 swung upwardly and the fixture 40 lowered as shown, it can be appreciated that the probe 42 will receive a definite portion of the printing light that would otherwise reach the light sensitive material 36 from the exposure lamp 12 when the shutter 14 is retracted into open position. Solely for the sake of discussion we will assume that either the filter turret 32 as been adjusted for black and white testing by rotating the opening 35 into the light path or that a particular color filter 34$b$, 34$g$ or 34$r$ has been rotated into such a position. More specifically, we will presume that it is the filterless opening 35. The timing switch 20 is a permanent part of the printer 10 and will automatically permit the shutter 14 to close after a prescribed time interval.

When light strikes the phototube 42 a photocurrent flows from the battery 48 via the anode 44 to the cathode 46, thereby providing an electrical signal in proportion to the total amount of light flux impinging upon the tube 42. The photocurrent will build up a charge on the plates of the capacitor 52, the rate of build up of course depending upon the magnitude of the current developed by the phototube, which in turn is directly controlled by the intensity of the light received by tube 42.

The circuit constants are such that the tube 64 is initially conducting. By reason of the flow of current through the plate resistor 72 a drop in voltage occurs which impresses a potential on the grid 58 that is sufficiently negative with respect to the cathode 60 so as to prevent conduction of the tube 54 under these imposed conditions. However, as the charge on the capacitor 52 builds up by reason of the signal derived from the phototube 42, the voltage impressed on the pate 56 rises, and upon reaching a high enough voltage for the bias being impressed on the grid 58, the tube 54 begins to conduct.

Prior to flow of current through the resistor, the grid 68 was at the same potential as the cathode 70 so that the tube 64 was maintained conductive. However, once a flow of current is established through the resistor 62 the bias applied to the grid 68 via the coupling capacitor 78 is driven more negative, the amount being sufficient to render the grid 68 sufficiently negative relative to the cathode 70 so as to stop the tube 64 from conducting. Such a happening has the immediate effect of raising the potential of the plate 66 to that of the "B" battery 74 with the concomitant result that the grid of tube 54 is made more positive. Very quickly, the tube 54 becomes fully conductive, owing to the positive change made to the grid 58.

Due to the sudden increase in conduction of the tube 54, the capacitor 52 is discharged, the path of course being through the resistor 62 and the tube 54. Such a sequence of events produces a voltage drop across the resistor and thus a detectable pulse that effects a registration on the pulse counter 80.

When the capacitor 52 becomes discharged in the manner described above, the plate voltage on the tube 54 falls sufficiently so that this tube again becomes nonconductive. Such action increases the bias in a positive direction applied to the grid 68 of tube 64 to cause this tube 64 to conduct once again. The conduction of tube 64 will continue until the capacitor 52 becomes recharged due to the signal derived from the phototube 42. When sufficiently recharged the foregoing operation repeats itself. Thus, in the present embodiment, the foregoing procedure will be continually repeated at a rate dependent upon the intensity of the light reaching the probe or head 42 from the lamp 12. As soon as the timing switch 20 becomes energized, the beam of light is interrupted by the spring 16 pulling the shutter into its light blocking position. The pulse counter 80, however, will show a total count or registration in accordance with the quanta of light energy that has been permitted to reach the phototube 42. In this way, a true photographic exposure reading has been made, the light conditions corresponding to what the photosensitive material 36 would have received had such material been in the horizontal position assumed by the phototube or probe 42.

In the preceding example, it has been assumed that the photosensitive material has been of the "black and white" variety. However, when color printing is undertaken the filter turret 32, or other filter holder, is placed in the light beam so that the light from the lamp 12 will traverse the individual filters 34b, 34g, and 34r. The reading procedure is the same.

Figure 3:
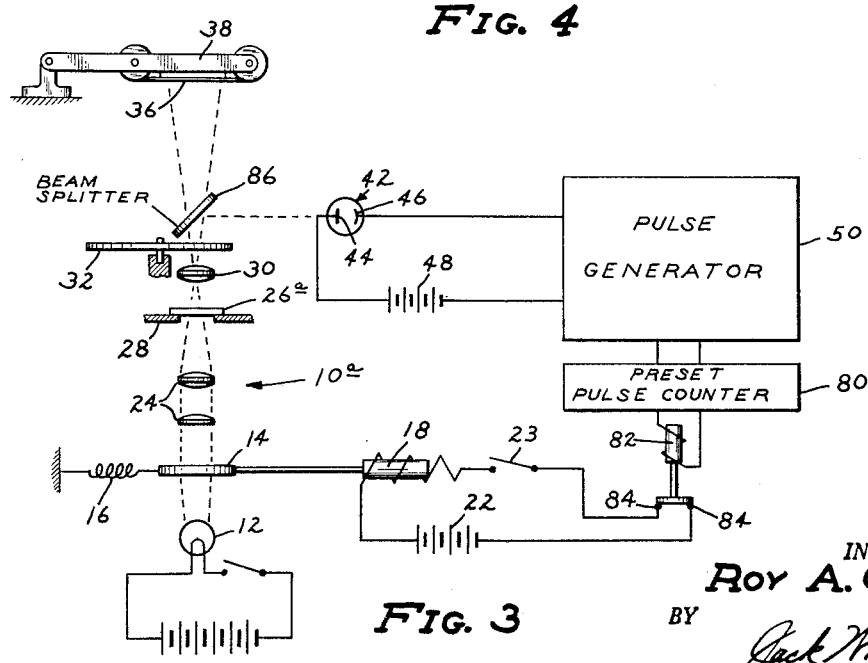
FIGURE 3 is a view generally similar to FIGURE 1 but showing the exposure reader incorporated into a control system for automatically terminating the exposure interval in the making of black and white prints.

Since it is within the contemplation of the invention to control the photographic exposure, FIGURE 3 has been selected for the purpose of exemplifying a system by which such an objective may be achieved. It will be recalled that in selecting the counter 80 that a preset counter was suggested. It is in the instant situation that the preset counter will actually be used, and while the preset feature could be incorporated into the counter 80 it would not be actually used in the reading system of FIGURE 1. To emphasize the rather minor addition of the preset feature in FIGURE 3, the counter has been denoted by the reference numeral 80a. Also, the printer in this situation has been given the numeral 10a and of course the transparency would be in the form of an actual black and white negative 26a. Upon the counter 80a reaching a preselected count or registration an output voltage is applied to the operating coil of a relay 82 having a pair of normally closed contacts 84. In this way the solenoid 18 will be deenergized by the relay 82 which is in lieu of the timing switch 20.

Inasmuch as the control will take place during an actual printing operation, a beam splitter 86 is utilized which permits by far the greater amount of light from the lamp 12 to pass therethrough, yet reflecting a relatively small portion of the light to one side onto the now laterally displaced photosensitive probe or tube 42.

In view of the operational description given for FIGURE 1, the operation of FIGURE 3 should be easily understood. With the counter 80a set for the registration indicative of the proper quanta of light needed to effect the proper exposure of the material 36, which will again be assumed to be "black and white," energization of the solenoid 18 will retract the shutter 14 to inaugurate the exposure period. Not only will light from the lamp 12 strike the photosensitive material 36 but a representative sample thereof will be reflected onto the phototube 42 to provide a voltage signal that will repetitively charge the capacitor 52 in the manner hereinbefore described. Pulses thus generated by the pulse generator 50 will be fed to the counter 80a. When the proper total of counts has been reached, such a registration representing the quanta of light energy that has struck the material 36, the counter will energize the relay 82 to open the contacts 84. This action deenergizes the solenoid 18 to close the shutter 14, thereby terminating the exposure interval at the proper moment.

It cannot be emphasized too strenuously the fact that the exposure illumination in practice may vary due to voltage fluctuations, or in systems where the lamp 12 is turned on and off the light will vary with time. Various magnifications, different lenses, bulb blackening, changes in filters and the like are some of the other variables that are involved, but which are inherently compensated for in the present system. Consequently, the system herein described is far superior to those depending upon time measurements for determining exposure.

Further, another nicety of the invention is that where the fixture 38 is adjustable to various vertical positions for making enlargements and where the fixture 40 has been mounted so as to move up and down in unison with the former fixture, it will make no difference as to what elevation the two fixtures 38, 40 happen to be when the exposure reading is made. This is because the area of the cathode 46 obviously remains constant and if moved away from the bulb 12 it simply receives less light (fewer photons) and when moved closer, it receives more. Thus, when the count on the counter 80 is constant and the cathode 46 is in the same plane (or the equivalent) that the material 36 is in when in use, the photographic exposure will be constant.

It is also within the purview of the invention to provide for the automatic control of a color printer or other color photographic apparatus. Accordingly, attention is now directed to FIGURE 4 where a system of control for colored printing is set forth. To distinguish the printer of FIGURE 4 from that set forth in FIGURE 3, the instant printer has been designated in its entirety by the reference character 10b. Here the photographic color negative has been given the numeral 26b and the light sensitive material the numeral 36a inasmuch as the material would be a multi-layer color sensitive printing paper.

Largely for drawing simplification the printer 10b of FIGURE 4 has been modified appreciably from the printer 10a. To avoid showing a plurality of shutters 14, a bank of lamps 12a, 12b and 12c is illustrated. More will be said presently concerning the control of these lamps. The lamps 12a, 12b and 12c are disposed in a partitioned housing 90 so that they are shielded from each other.

Above each lamp is a different color filter, a blue filter being designated by the numeral 92b, a green one by the numeral 92g and a red one as 92r. Thus, when any of the lamps 12a, 12b, 12c are on, light will be passed through the respective filters to a diffuser 94.

As in the system of FIGURE 3, the color system of printing currently under discussion makes use of the beam splitter 86 for diverting some of the light energy to one side. The energy so diverted first strikes a dichroic mirror 96 capable of transmitting therethrough yellow light but reflecting blue light onto a phototube 42a. In similar fashion, the yellow light passing through the dichroic mirror 96 strikes a second dichroic mirror 98, this mirror being capable of reflecting red light but transmitting cyan light therethrough. The reflected red light strikes a phototube 42b, whereas the transmitted light impinges on a phototube 42c. Each phototube 42a, 42b and 42c is connected in circuit with a variable frequency pulse generator identical to the generator 50, the generators here presented being designated as 50a, 50b, 50c. The output pulses from each generator 50 are fed to a preset pulse counter 80a, 80b, 80c, and under the supervisory control of these counters are relays 82a, 82b and 82c corresponding to the relay 82 of FIGURE 2. As such, the relays 82a, 82b and 82c are equipped with normally closed contacts 84a, 84b and 84c, respectively.

It is now that it can be explained that the lamps 12a, 12b and 12c are individually connectable to a suitable energizing source at 100 by way of a switch 102. As depicted in FIGURE 4 the normally closed contacts 84a are in circuit with the lamp 12a for terminating the blue exposure; the contacts 84c are in circuit with the lamp 12b for terminating the green exposure, and contacts 84b are in circuit with the lamp 12c for ending the red exposure.

With the respective operations of FIGURES 1 and 3 in mind, the operation of FIGURE 4 may be quickly grasped, it is felt. Having first set the various counters 80a, 80b and 80c for the count registrations that will provide the appropriate blue, green and red exposures, the switch 102 may be closed to energize all three of the lamps 12a, 12b and 12c. No exact order or sequence for terminating the blue, green and red exposures can be given, for the order will be governed by such factors as the coloring in the negative 26b, the emulsion sensitivities of the paper 36a and the density of the filters 92b, 92g, 92r. As hereinbefore mentioned in conjunction with the brief description given concerning the filter turret 32, the use of neutral density filters will have a direct influence on the light that is transmitted and hence enter into the situation as far as specific counts are concerned. We will assume, though, that the blue exposure is to be stopped first, then the green and finally the red. For the sake of discussion we might further assume that the blue period might require 350 counts, the green period 650 counts and the red 975 counts for a given set of conditions. Thus, the counter 80a would be set to energize the relay 82a when 350 counts have been registered, the counter 80c its relay 82c when 650 counts have been reached, and the counter 80b its relay 82b when a total of 950 has been realized. Owing to the circuit arrangement set forth in FIGURE 4 all of the lamps 12a, 12b and 12c would be energized for 350 counts. Then the lamp 12a would be turned off with the lamps 12b and 12c remaining energized until 300 more counts had been registered which would give the 650 counts that we have arbitrarily assumed for terminating the green exposure. At that time the lamp 12b would be deenergized, leaving only the lamp 12c on. Of course, the lamps 12a, 12b and 12c could be energized in succession, if desired, each for the proper count needed for the particular color afforded by the particular filter associated therewith. Likewise, a shutter arrangement might be employed.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In combination with photographic exposure apparatus having an exposure lamp for supplying light energy to light sensitive material when disposed therewithin, a photosensitive probe located so as to receive a portion of the light energy transmitted from said lamp, said probe developing an electrical output signal having a magnitude in accordance with the light impinging thereon, a storage capacitor in circuit with said probe capable of being charged by said electrical signal, a first vacuum tube triode and plate resistor connected in series across said capacitor, the triode thereby receiving its plate supply from said capacitor, a second vacuum tube triode, a second plate resistor in series with said second tube, a source of potential for said second triode, said source being connected to both said plate resistors, means capacitively coupling a point intermediate the first resistor and the plate of said first triode to the control grid of said second triode, the corresponding point intermediate the second resistor and the plate of said second triode being connected to the control grid of said first triode, and counting means connected across said first resistor for determining the number of times said storage capacitor is discharged through said first triode.

2. In combination with photographic exposure apparatus having an exposure lamp for supplying light energy to light sensitive material when disposed therewithin, a photosensitive probe located so as to receive a portion of the light energy transmitted from said lamp, said probe developing an electrical output signal having a magnitude in accordance with the light impinging thereon, a normally conducting vacuum tube having a plate, cathode and control grid, a normally non-conducting vacuum tube having a plate, cathode and control grid, a resistor in the plate circuit of said second vacuum tube, said plate circuit including said photosensitive probe, a capacitor connected in parallel with said second vacuum tube and said resistor for causing initial conduction of said second tube when a sufficient charge has been built up in said capacitor due to light impinging upon said probe, circuit means connected between said resistor and the grid of said first vacuum tube for stopping conduction of said first tube, means connected between the plate of said first tube and the grid of said second tube for rendering said second tube fully conductive, and counting means connected across said resistor for determining the number of times said capacitor is discharged through said normally non-conducting tube.

3. The combination set forth in claim 2 including means mounting said probe within the apparatus so that it can be moved into the plane in which the light sensitive material normally resides when it is subjected to the energy from said exposure lamp.

4. In combination with photographic apparatus having a sheet of multilayered light sensitive material disposed therewithin, first means for supplying blue light to said material, second means for supplying green light to said material, and third means for supplying red light to said material, a beam splitter located intermediate said several light supplying means and said light sensitive material, a first dichroic mirror positioned in the path of the light diverted by said beam splitter, said first dichroic mirror transmitting yellow light therethrough and reflecting blue light, a second dichroic mirror in the path of light transmitted through said first mirror, said second dichroic mirror transmitting cyan light therethrough and reflecting red light, a first photosensitive probe located so as to receive a portion of the blue light reflected by said first dichroic mirror, a second photosensitive probe located so as to receive a portion of the red light reflected from said second dichroic mirror, a third photosensitive probe located so as to receive a portion of the cyan light transmitted through said second mirror, each of said probes developing an electrical signal in accordance with the intensity of the light impinging thereon, a variable frequency pulse generator in circuit with each probe for generating pulses at a rate dependent upon the magnitude of the electrical signal developed by the probe with which it is associated, each generator including a normally conducting vacuum tube having a plate, cathode and control grid, a normally non-conducting vacuum tube having a plate, cathode and control grid, a resistor in the plate circuit of said second vacuum tube, said plate circuit in each instance including the particular photosensitive probe with which its generator is associated, a capacitor connected in parallel with said second vacuum tube and said resistor for causing initial conduction of said second tube when a sufficient charge has been built up in said capacitor due to light impinging upon the probe in circuit therewith, circuit means connected between said resistor and the grid of said first vacuum tube for stopping conduction of said first tube and means connected between the plate of said first tube and the grid of said second tube for rendering said second tube fully conductive, and a counter means connected to each of said generators for counting the pulses generated by said generators during the time that said first, second and third light means are supplying light.

References Cited in the file of this patent

UNITED STATES PATENTS 2,232,373     Dorst     Feb. 18, 1941

(Other references on following page)

UNITED STATES PATENTS

| | | |
|---|---|---|
| 2,269,161 | Morse | Jan. 6, 1942 |
| 2,352,914 | Rackett | July 4, 1944 |
| 2,386,320 | Kott | Oct. 9, 1945 |
| 2,402,660 | O'Grady | June 25, 1946 |
| 2,470,584 | Simmon | May 17, 1949 |
| 2,518,947 | Simmon | Aug. 15, 1950 |
| 2,566,264 | Tuttle et al. | Aug. 28, 1951 |
| 2,607,266 | Rabinowitz | Aug. 19, 1952 |
| 2,990,757 | Ponsar | July 4, 1961 |

FOREIGN PATENTS

| | | |
|---|---|---|
| 460,452 | Great Britain | Jan. 28, 1937 |
| 491,613 | Great Briain | Sept. 6, 1938 |